United States Patent
Yoshizawa et al.

(10) Patent No.: US 6,971,727 B2
(45) Date of Patent: Dec. 6, 2005

(54) VEHICLE BRAKE SYSTEM

(75) Inventors: Ryozo Yoshizawa, Wako (JP); Isamu Nakanishi, Wako (JP)

(73) Assignee: Honda Giken Kogyo Kabushiki Kaisha, Minato-ku (JP)

( * ) Notice: Subject to any disclaimer, the term of this patent is extended or adjusted under 35 U.S.C. 154(b) by 0 days.

(21) Appl. No.: 10/439,043

(22) Filed: May 14, 2003

(65) Prior Publication Data

US 2003/0227217 A1  Dec. 11, 2003

(30) Foreign Application Priority Data

Jun. 6, 2002  (JP) ............................. 2002-166114

(51) Int. Cl.[7] ................................................. B60T 7/12
(52) U.S. Cl. ...................... 303/193; 303/191; 180/275
(58) Field of Search ............................ 303/191, 193, 303/113.1; 180/275

(56) References Cited

U.S. PATENT DOCUMENTS

| | | | |
|---|---|---|---|
| 6,105,705 A | * | 8/2000 | Faye .......................... 180/275 |
| 6,267,194 B1 | | 7/2001 | Bullinger et al. |
| 6,364,433 B1 | | 4/2002 | Stemer |
| 6,530,450 B2 | * | 3/2003 | DeLuca et al. ............. 180/275 |
| 2002/0055410 A1 | * | 5/2002 | Nagasaka ..................... 477/94 |

FOREIGN PATENT DOCUMENTS

| | | |
|---|---|---|
| EP | 1 010 596 A2 | 6/2000 |
| EP | 1 369 327 A1 | 12/2003 |
| JP | 2000355273 A | 12/2000 |

\* cited by examiner

*Primary Examiner*—Robert A. Siconolfi
*Assistant Examiner*—Bradley T. King
(74) *Attorney, Agent, or Firm*—Hamre, Schumann, Mueller & Larson, P.C.

(57) ABSTRACT

A vehicle brake system includes a brake mechanism for individually braking wheels, and a brake controller for controlling the brake mechanism against an oblique collision from behind or an offset collision with a host vehicle. The controller includes a collision predictor, a collision direction detector, and a colliding object speed detector. In accordance with a prediction signal transmitted from the collision predictor, a detection signal transmitted from the collision direction detector and a detection signal transmitted from the colliding object speed detector, the controller controls the operation of the brake mechanism to allocate braking forces to the respective wheels so as to prevent the turning of the host vehicle in a collision.

8 Claims, 14 Drawing Sheets

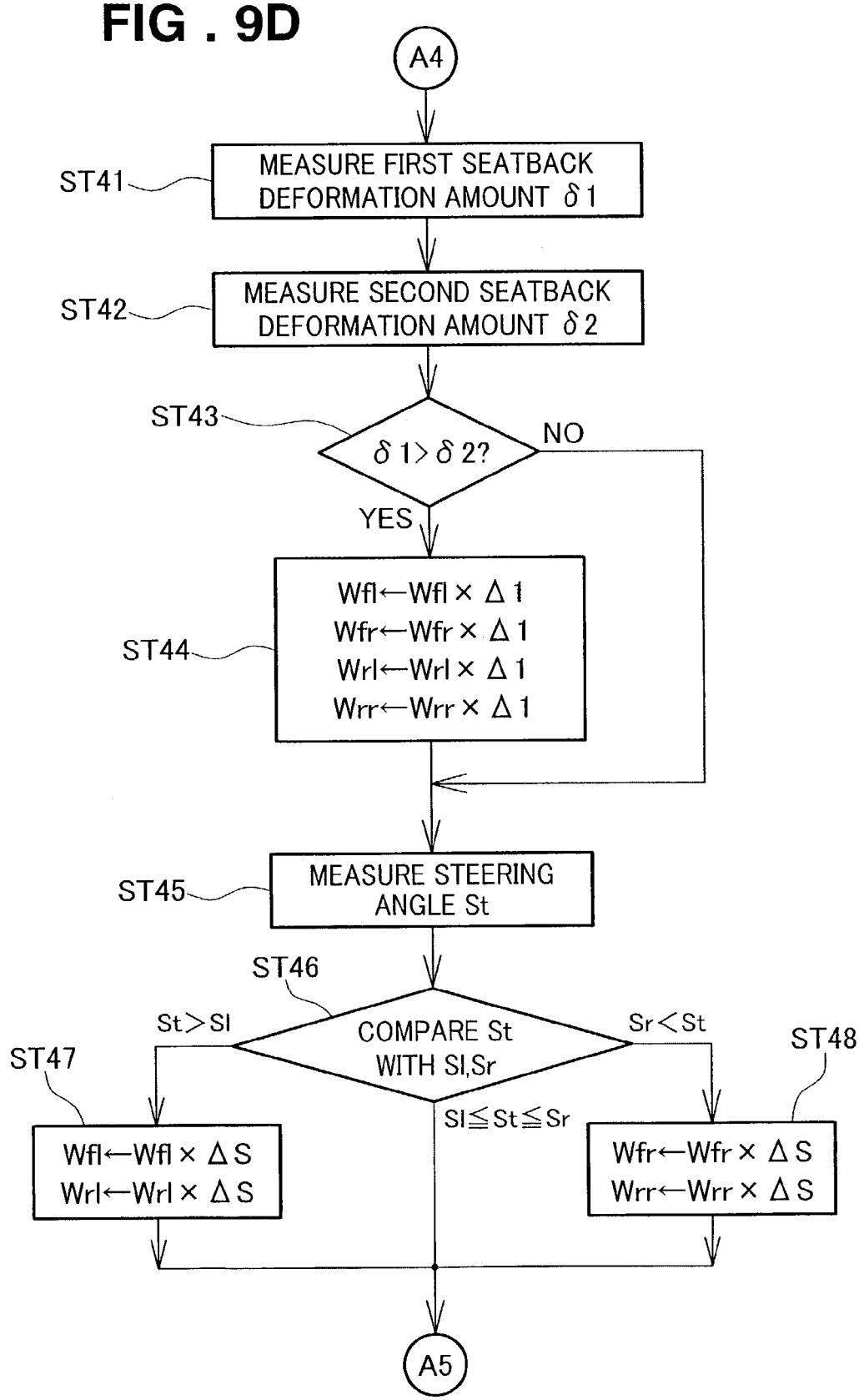

FIG. 10

| COLLISION MODE COEFFICIENTS S | COLLISION MODES | BRAKE COEFFICIENTS | | | |
|---|---|---|---|---|---|
| | | LEFT FRONT WHEEL Rfl | RIGHT FRONT WHEEL Rfr | LEFT REAR WHEEL Rrl | RIGHT REAR WHEEL Rrr |
| 1 | DIRECTLY BEHIND | 2.5 | 2.5 | 2.5 | 2.5 |
| 2 | LARGE OFFSET TO THE LEFT | 3.5 | 2.5 | 4.5 | 1.5 |
| 3 | MEDIUM OFFSET TO THE LEFT | 3 | 2 | 4 | 1 |
| 4 | SMALL OFFSET TO THE LEFT | 2.5 | 1.5 | 3.5 | 0.5 |
| 5 | LARGE OFFSET TO THE RIGHT | 2.5 | 3.5 | 1.5 | 4.5 |
| 6 | MEDIUM OFFSET TO THE RIGHT | 2 | 3 | 1 | 4 |
| 7 | SMALL OFFSET TO THE RIGHT | 1.5 | 2.5 | 0.5 | 3.5 |
| 8 | LARGE ANGLE OF OBLIQUE COLLISION FROM THE LEFT REAR | 2.5 | 3.5 | 1.5 | 4.5 |
| 9 | MEDIUM ANGLE OF OBLIQUE COLLISION FROM THE LEFT REAR | 2 | 3 | 1 | 4 |
| 10 | SMALL ANGLE OF OBLIQUE COLLISION FROM THE LEFT REAR | 1.5 | 2.5 | 0.5 | 3.5 |
| 11 | LARGE ANGLE OF OBLIQUE COLLISION FROM THE RIGHT REAR | 3.5 | 2.5 | 4.5 | 1.5 |
| 12 | MEDIUM ANGLE OF OBLIQUE COLLISION FROM THE RIGHT REAR | 3 | 2 | 4 | 1 |
| 13 | SMALL ANGLE OF OBLIQUE COLLISION FROM THE RIGHT REAR | 2.5 | 1.5 | 3.5 | 0.5 |

//

VEHICLE BRAKE SYSTEM

TECHNICAL FIELD

The present invention relates to a vehicle brake system for braking a host vehicle when anticipating a potential collision of a vehicle behind with the host vehicle.

BACKGROUND ART

Such a vehicle brake system is know from, for example, Japanese Patent Laid-Open Publication No. 2000-355273 entitled "VEHICLE PASSENGER PROTECTION SYSTEM". This protection system will be briefly described with reference to FIG. 12 hereof.

A conventional vehicle brake system 100 shown in FIG. 12 has a collision predicting means 101 for predicting an object which is likely to collide from behind with a host vehicle, a front obstacle detecting means 102 for detecting the presence of an obstacle in front of the host vehicle, a driving condition detecting means 103 for detecting the driving condition of the host vehicle, a brake operation detecting means 104 for detecting the operational state of brakes by a driver, a backseat occupant detecting means 105 for detecting the presence of a passenger in a backseat of the host vehicle, an approaching speed detecting means 106 for detecting the approaching speed of an obstacle coming close to the rear of the host vehicle, and an automatic brake controlling means 108 for directing a brake mechanism 107 to automatically operate in response to a collision prediction signal or the like from the collision predicting means 101.

When the collision predicting means 101 anticipates a potential collision of an object from behind with the host vehicle and transmits a collision prediction signal, the controlling means 108 directs the brake mechanism 107 of the host vehicle to automatically operate. When the object collides with the host vehicle from behind, the host vehicle is thus prevented from moving forward, and passengers are protected from being forcefully pressed at their upper bodies against the seatback.

The above conventional protection system is effective in the protection of passengers and the prevention of forward travel of a host vehicle with the brake mechanism 107 effectively working when an object collides with the host vehicle from directly behind.

However, a vehicle behind as a colliding object often collides with a host vehicle traveling ahead obliquely from behind or from a rear off-center position relative to the host vehicle (offset collision). Upon an oblique collision from behind or an offset collision, the host vehicle turns by the impact energy. The acceleration at the start of the turning motion is greater at a portion farther from the turning center. As a result, the acceleration in the turning direction exerted on passengers of the host vehicle largely differs, depending on the seated locations of the passengers. In order to enhance the passenger protection, the acceleration in the turning direction exerted on passengers should be taken into account, which is not easy.

Further, the behavior of the host vehicle in a turning motion is intricate. It is not easy for the host vehicle to avoid surrounding obstacles if any.

It is thus desired to improve the passenger protection of a host vehicle even when a vehicle behind collides with the host vehicle from directly behind, obliquely from behind or from a rear off-center position, and also to facilitate the avoidance of obstacles around the host vehicle.

SUMMARY OF THE INVENTION

According to the present invention, there is provided a vehicle brake system, which comprises: a brake mechanism for individually braking wheels of a vehicle; and a brake controller for directing the brake mechanism to automatically operate, the brake controller including: a collision predicting means for predicting a colliding object to collide from behind with the vehicle of a speed equal to or lower than a predetermined threshold; a collision direction detecting means for detecting a relative collision direction such as an off-center amount or a collision angle of the colliding object with respect to the vehicle; and a colliding object speed detecting means for detecting the speed of the colliding object, the brake controller directing the brake mechanism in accordance with a prediction signal from the collision predicting means, a detection signal from the collision direction detecting means and a detection signal from the colliding object detecting means, to allocate braking forces to the respective wheels so as to prevent the turning of the vehicle in a collision.

In accordance with a prediction signal transmitted from the collision predicting means, a detection signal transmitted from the collision direction detecting means and a detection signal transmitted from the colliding object speed detecting means, the brake controller controls the operation of the brake mechanism to allocate braking forces to the respective wheels so as to prevent the turning of the host vehicle in a collision. Even when a colliding object collides with the host vehicle from behind obliquely or from a rear off-center position, braking forces can be allocated in accordance with the collision type and the speed of the colliding object to restrain the turning motion of the host vehicle.

As a result, acceleration in the turning direction exerted on passengers in the host vehicle can be restrained, resulting in further improved passenger protection. For example, since the body of a passenger seated in a seat is prevented from swinging sideways, the neck of the passenger can be supported on a headrest of the seat, and strain on the neck of the passenger can be more reliably reduced.

Further, since the turning motion of the host vehicle is restrained, the behavior of the host vehicle in a collision can be stabilized, easily avoiding obstacles if any around the host vehicle.

In the present invention, the above expression "a speed equal to or lower than a predetermined threshold" includes the vehicle parked.

In the present invention, the brake mechanism preferably includes a left front brake for braking a left front wheel, a right front brake for braking a right front wheel, a left rear brake for braking a left rear wheel and a right rear brake for braking a right rear wheel, and a main brake for allocating braking forces to the respective brakes.

BRIEF DESCRIPTION OF THE DRAWINGS

Preferred embodiments of the present invention will be described in detail below, by way of example only, with reference to the accompanying drawings, in which:

FIGS. 9A to 9D are flowcharts illustrating the control operation of a brake controller according to the present invention;

FIG. 10 is a map illustrating brake coefficients of the respective wheels for each collision mode;

DETAILED DESCRIPTION OF THE PREFERRED EMBODIMENTS

The following description is merely exemplary in nature and is in no way intended to limit the invention, its application or uses.

Figure 1:
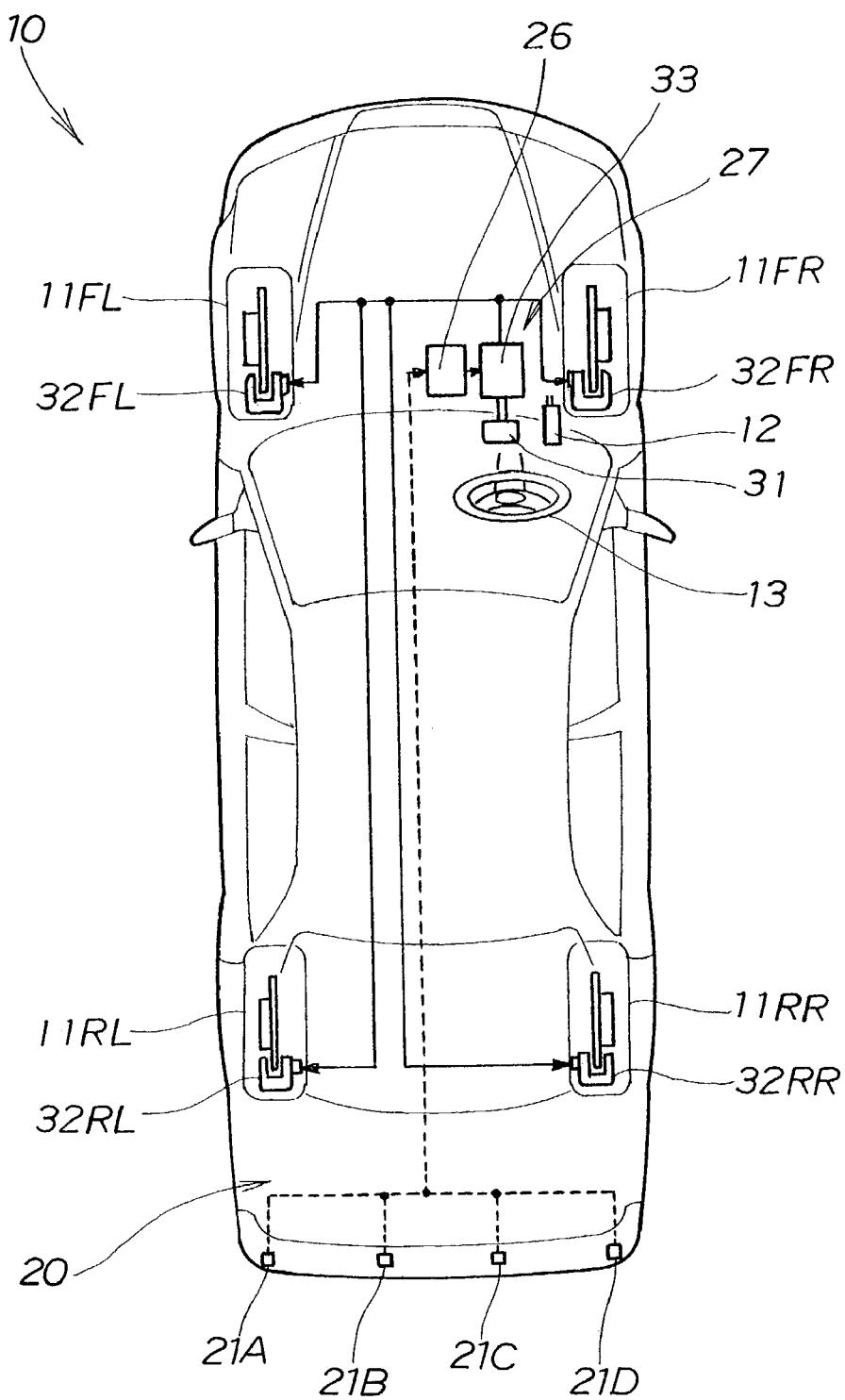
FIG. 1 is a plan view of a vehicle having a brake system according to the present invention.

As shown in FIG. 1, a vehicle 10 is equipped with a vehicle brake system 20. The host vehicle 10 has a brake mechanism 27 for individually braking a left front wheel 11FL, a right front wheel 11FR, a left rear wheel 11RL and a right rear wheel 11RR, a brake controller 26 for controlling the operation of the brake mechanism 27, an accelerator pedal 12, a steering wheel 13, and a plurality of (e.g., four) distance detectors 21A to 21D.

The brake mechanism 27 is a hydraulic brake mechanism which can be operated by a brake pedal 31. The brake mechanism 27 has a left front brake 32FL for braking the left front wheel 11FL, a right front brake 32FR for braking the right front wheel 11FR, a left rear brake 32RL for braking the left rear wheel 11RL and a right rear brake 32RR for braking the right rear wheel 11RR, and a main brake 33 (such as a brake booster) for allocating braking force to each of the brakes 32FL, 32FR, 32RL and 32RR.

The distance detectors 21A to 21D are sensors for measuring the distance between the host vehicle 10 and a vehicle 40 behind (see FIG. 3A), transversely aligned at the rear of the vehicle 10.

The distance detectors 21A to 21D are, for example, ultrasonic sensors, infrared sensors, ultraviolet sensors, visible light sensors, laser sensors, radar sensors, or imaging systems such as CCDs, which are set smaller in angle of beam spread.

The vehicle 40 behind is an object to collide with the host vehicle 10 from behind.

Figure 2:
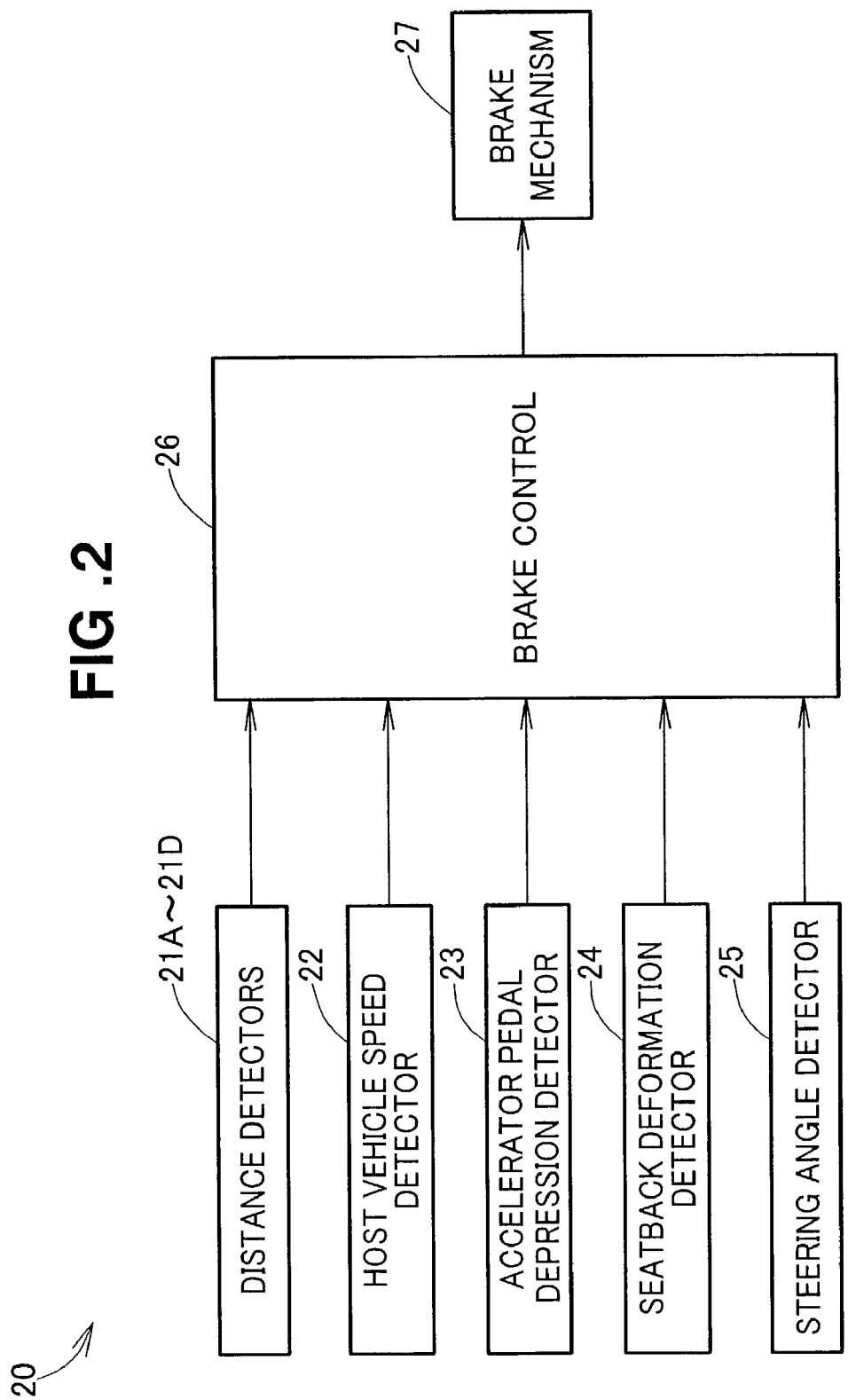
FIG. 2 is a block diagram of the vehicle brake system according to this invention.

As shown in FIG. 2, the vehicle brake system 20 has the four distance detectors 21A to 21D, a host vehicle speed detector 22, an accelerator pedal detector 23, a seatback deformation detector 24, a steering angle detector 25, the brake controller 26, and the brake mechanism 27.

The host vehicle speed detector 22 is a speed sensor. The accelerator pedal detector 23 is a detection switch for detecting the depression of the accelerator pedal 12 (see FIG. 1). The steering angle detector 25 is a sensor for detecting the steering angle of the steering wheel 13 (see FIG. 1). The seatback deformation detector 24 will be described in detail below.

FIGS. 3A to 3E illustrate exemplary types of collision of the vehicle 40 behind with the host vehicle 10, illustrating the relative collision direction of the vehicle 40 behind with respect to the host vehicle 10.

FIG. 3A illustrates an example in which the vehicle 40 behind as a colliding object collides with the host vehicle 10 from directly behind.

FIG. 3B illustrates an example in which the vehicle 40 behind off-centered to the left by an off-center amount f1 collides with the host vehicle 10 from behind (left offset collision).

FIG. 3C illustrates an example in which the vehicle 40 behind off-centered to the right by an off-center amount f1 collides with the host vehicle 10 from behind (right offset collision).

FIG. 3D illustrates an example in which the vehicle 40 behind obliquely collides with the host vehicle 10 from the left rear at a collision angle θ (oblique left-rear-end collision).

FIG. 3E illustrates an example in which the vehicle 40 behind obliquely collides with the host vehicle 10 from the right rear at a collision angle θ (oblique right-rear-end collision).

Now the principle of identifying the collision types of the vehicle 40 behind with the host vehicle 10 will be described with reference to FIGS. 4, 5 and 6. The four distance detectors 21A to 21D are distinguished by affixing the ordinal numbers "first, second, third and forth" to them, respectively.

Figure 4:
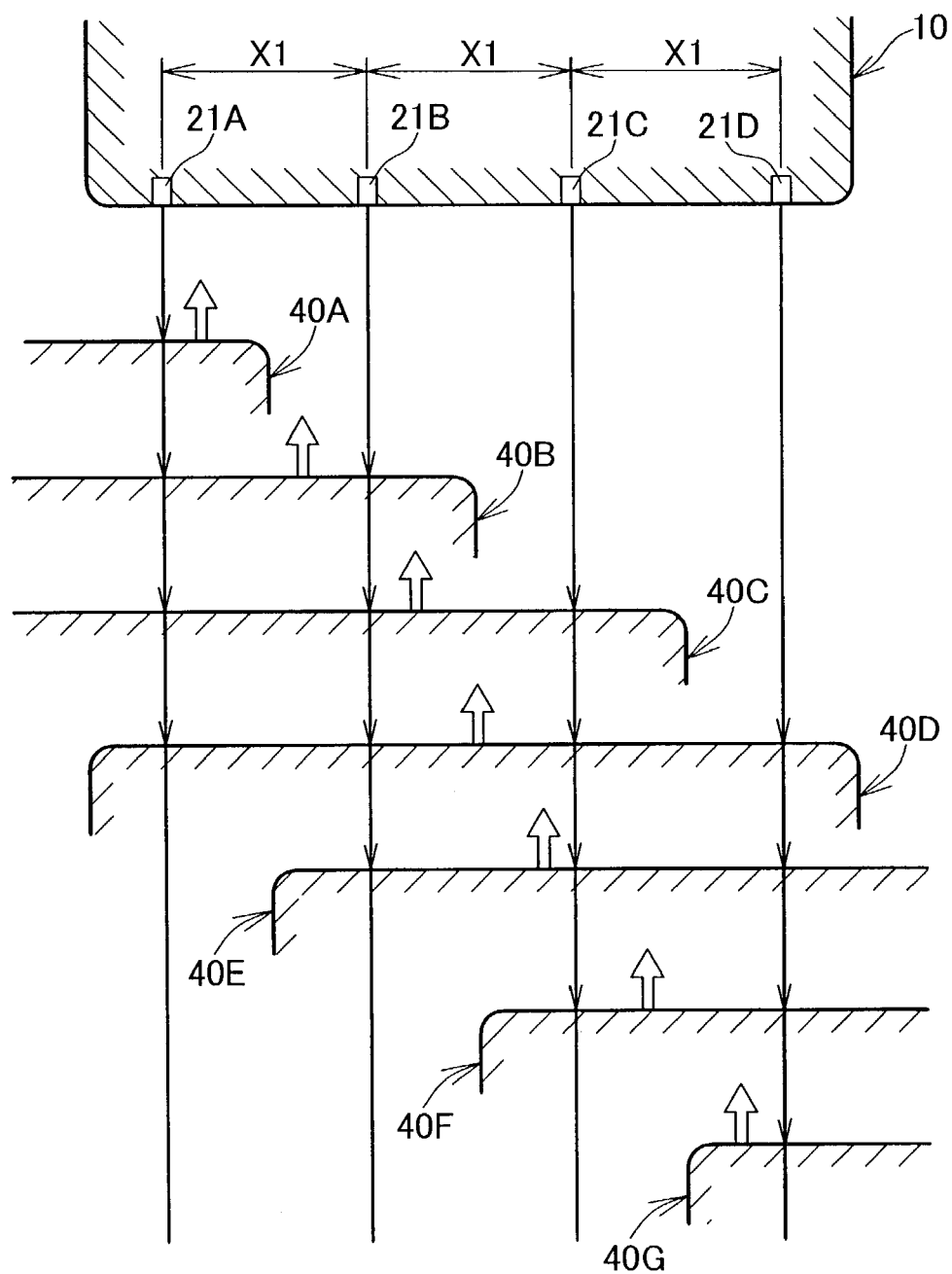
FIG. 4 is a diagram illustrating collision types of offset collisions and a collision from directly behind of a vehicle behind with the host vehicle.

As shown in FIG. 4, the four distance detectors 21A, 21B, 21C and 21D are transversely aligned at equal intervals from left to right at the rear of the host vehicle 10 in the order of the first distance detector 21A, the second distance detector 21B, the third distance detector 21C and the fourth distance detector 21D. The spaces between the distance detectors 21A to 21D are X1. In FIG. 4, reference signs A, B, C, D, E, F and G are affixed to the vehicle 40 behind for distinction to facilitate understanding of the collision types.

When only the leftmost first distance detector 21A detects the vehicle 40A behind, it is identified as an offset collision in which the vehicle 40A behind largely off-centered to the left (large offset to the left) collides with the host vehicle 10. This is an example of the collision type shown in FIG. 3B.

When only the first and second distance detectors 21A and 21B detect the vehicle 40B behind, it is identified as an offset collision in which the vehicle 40B behind moderately off-centered to the left (middle offset to the left) collides with the host vehicle 10. This is also an example of the collision type shown in FIG. 3B.

When only the first, second and third distance detectors 21A, 21B and 21C detect the vehicle 40C behind, it is identified as an offset collision in which the vehicle 40C behind slightly off-centered to the left (small offset to the left) collides with the host vehicle 10. This is also an example of the collision type shown in FIG. 3B.

When all of the first, second, third and fourth distance detectors 21A, 21B, 21C and 21D detect the vehicle 40D behind, it is identified as a collision of the vehicle 40D from directly behind with the host vehicle 10. This is the collision type shown in FIG. 3A.

When only the second, third and fourth distance detectors 21B, 21C and 21D detect the vehicle 40E behind, it is identified as an offset collision in which the vehicle 40E behind slightly off-centered to the right (small offset to the right) collides with the host vehicle 10. This is an example of the collision type shown in FIG. 3C.

When only the third and fourth distance detectors 21C and 21D detect the vehicle 40F behind, it is identified as an offset collision in which the vehicle 40F behind moderately off-centered to the right (middle offset to the right) collides with the host vehicle 10. This is also an example of the collision type shown in FIG. 3C.

When only the rightmost fourth distance detector 21D detects the vehicle 40G behind, it is identified as an offset collision in which the vehicle 40G behind largely off-centered to the right (large offset to the right) collides with the host vehicle 10. This is also an example of the collision type shown in FIG. 3C.

Figure 5:
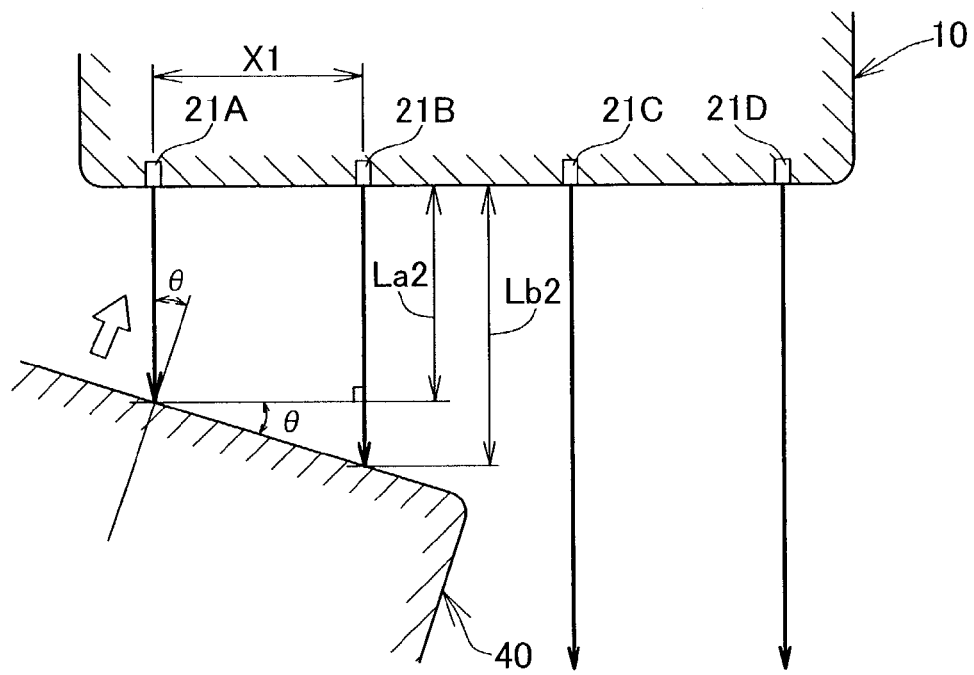
FIG. 5 is a diagram illustrating a state of a vehicle behind obliquely colliding from the left rear with the host vehicle.

FIG. 5 illustrates a collision type in which the vehicle 40 behind obliquely collides with the host vehicle 10 from the left rear at a collision angle θ. This is an example of the collision type shown in FIG. 3D.

At that time, the distance between the vehicles 10 and 40 measured by the leftmost first distance detector 21A is La2, and the distance between the vehicles 10 and 40 measured by the second distance detector 21B is Lb2. The space between the first and second distance detectors 21A and 21B is X1. The collision angle θ can be derived from relational expression (1) below:

$$\theta = \tan^{-1}\{(Lb2-La2)/X1\} \quad (1)$$

That is, the largeness of the collision angle θ is determined by the distances La2 and Lb2 between the vehicles 10 and 40.

Figure 6:
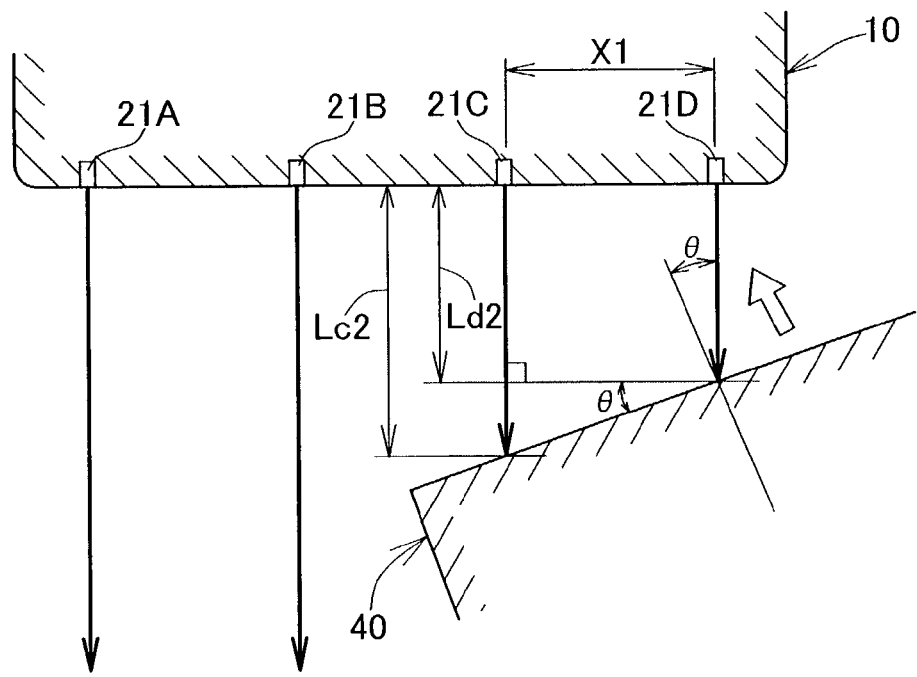
FIG. 6 is a diagram illustrating a state of a vehicle behind obliquely colliding from the right rear with the host vehicle.

FIG. 6 illustrates a collision type in which the vehicle 40 behind obliquely collides with the host vehicle 10 from the right rear at a collision angle θ. This is an example of the collision type shown in FIG. 3E.

At that time, the distance between the vehicles 10 and 40 measured by the third distance detector 21C is Lc2, and the distance between the vehicles 10 and 40 measured by the rightmost fourth distance detector 21D is Ld2. The space between the third and fourth distance detectors 21C and 21D is X1. The collision angle θ can be derived from relational expression (2) below:

$$\theta = \tan^{-1}\{(Lc2-Ld2)/X1\} \quad (2)$$

That is, the largeness of the collision angle θ is determined by the distances Lc2 and Ld2 between the vehicles 10 and 40.

As described above, the four distance detectors 21A to 21D detect the vehicle 40 behind, in other words, measure distances between the host vehicle 10 and the vehicle 40 behind, facilitating the identification of collision type of the vehicle 40 behind with the host vehicle 10.

Figure 7:
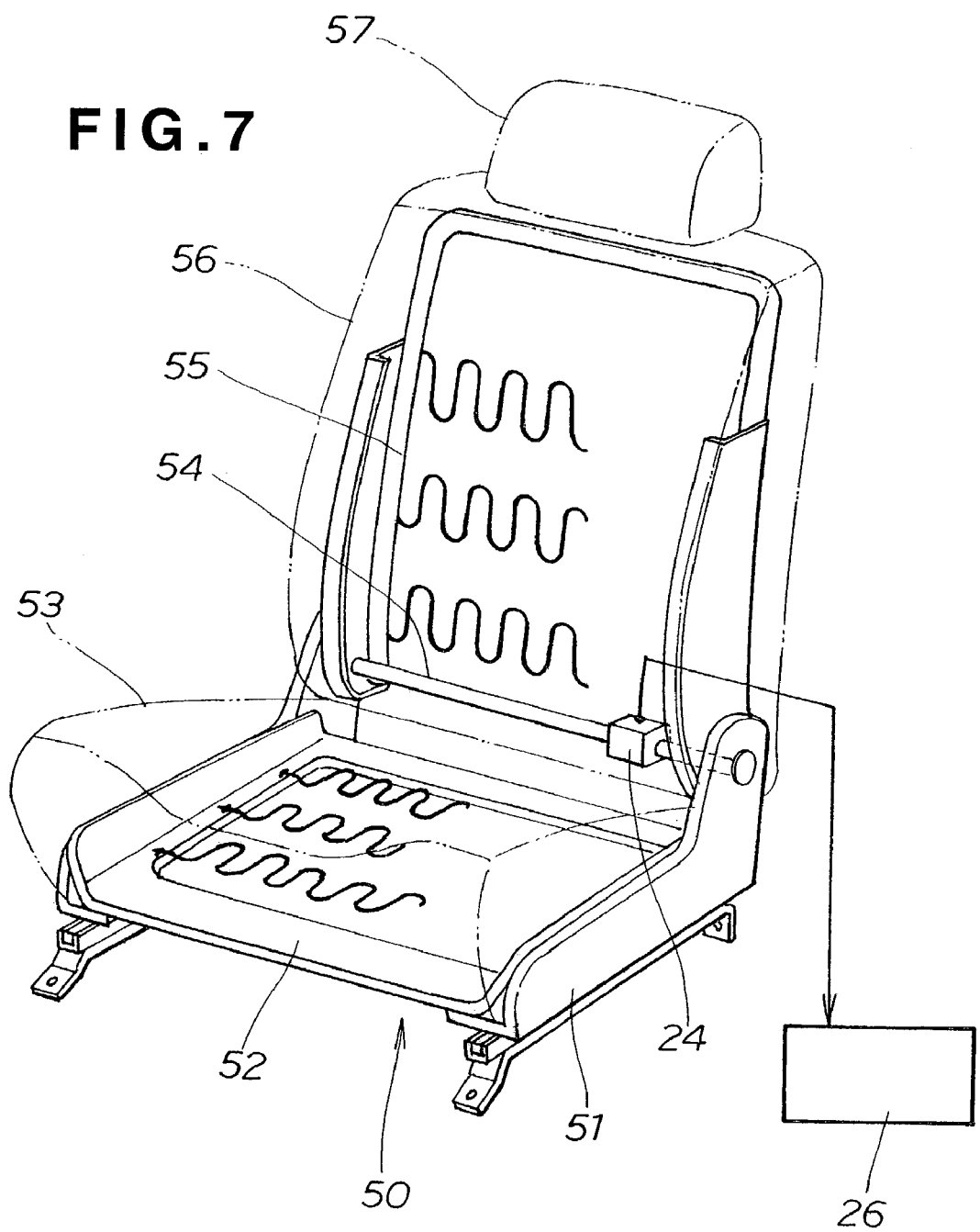
FIG. 7 is a perspective view illustrating the configuration of a vehicle seat for use in the present invention.

FIG. 7 illustrates a seat 50 for use in the vehicle brake system 20 according to the present invention. The seat 50 includes a seat support 51 placed on the vehicle floor shown in FIG. 1, a seat cushion 53 and a seatback 56 provided on the seat support 51, and a headrest 57 provided on top of the seatback 56.

The seat cushion 53 is mounted on the seat support 51 via a seat cushion frame 52. A seatback frame 55 is mounted to the seat support 51 via a hinge 54 in a forward and backward movable manner. The seatback 56 is mounted to the seatback frame 55. The headrest 57 is mounted on top of the seatback frame 55.

The seat 50 has the seatback deformation amount detector 24 for detecting the amount of deformation of the seatback 56. When a rearward external force acts on the seatback 56, deformation occurs in the hinge 54 and the seatback 56 in accordance with the magnitude of the external force. The amount of deformation caused in the hinge 54 is detected by the seatback deformation amount detector 24 as the amount of deformation of the seatback 56.

Figure 8A:
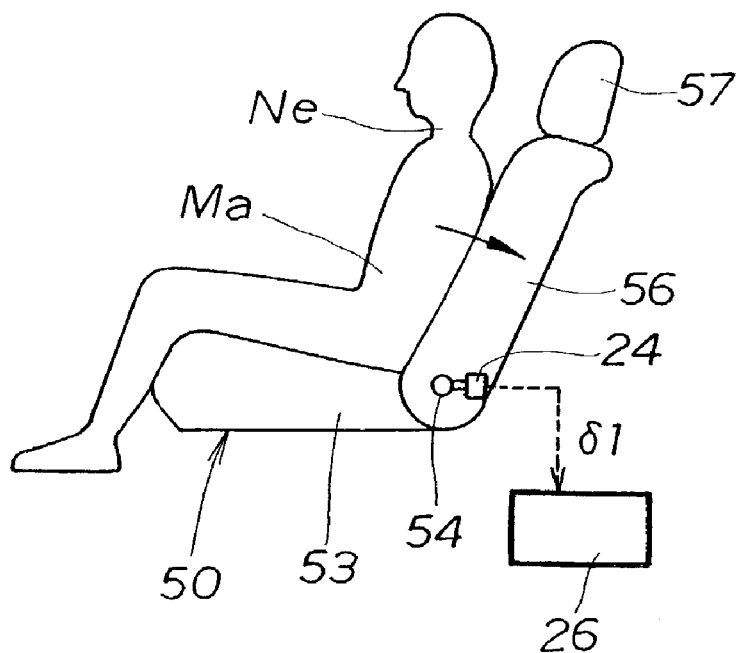
FIGS. 8A and 8B are diagrams illustrating the relationship between a passenger reacting to a collision from behind and a seat.

As shown in FIG. 8A, upon a collision from behind, the upper body of a passenger Ma seated in the seat 50 moves backward in reaction, and an external force is applied from the upper body to the seatback 56. The external force causes the seatback 56 to move backward. The seatback 56 deforms in accordance with the magnitude of the rearward external force. A first amount of deformation δ1 is detected by the seatback deformation amount detector 24.

Figure 8B:
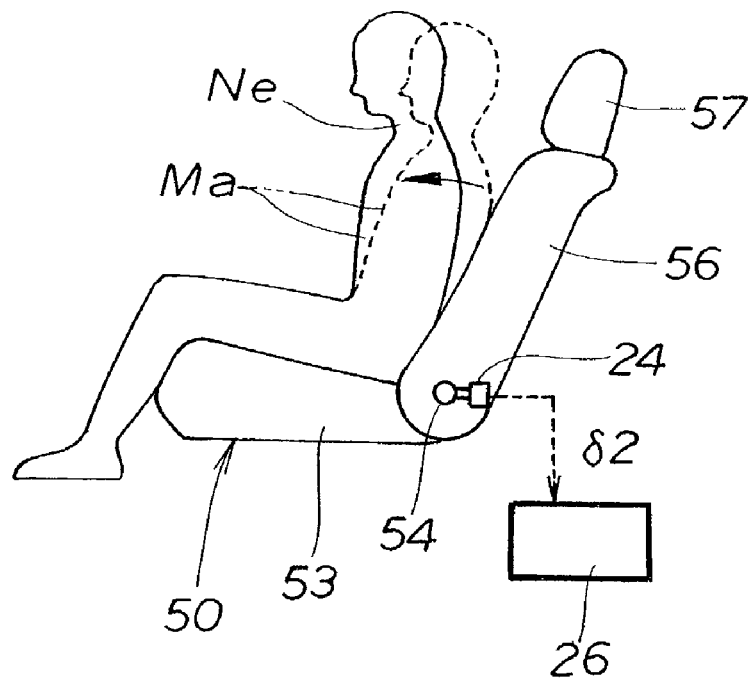

The reaction against the upper body of the passenger Ma pressing the seatback 56 causes the upper body of the passenger Ma to again move forward (rebound) as shown in FIG. 8B. As a result, the external force acting on the seatback 56 is reduced, resulting in a reduced deformation amount δ2 of the seatback 56. The reduced deformation amount δ2 is detected by the seatback deformation amount detector 24.

Based on the deformation amount δ1 on the bound shown in FIG. 8A, the brake controller 26 determines the reduction to the deformation amount δ2 on the rebound shown in FIG. 8B and controls the brake mechanism 27 (see FIG. 2) to reduce the braking force. As a result, the reaction acting on the passenger Ma on the rebound can be reduced, resulting in the protection of the passenger Ma.

Figure 11:
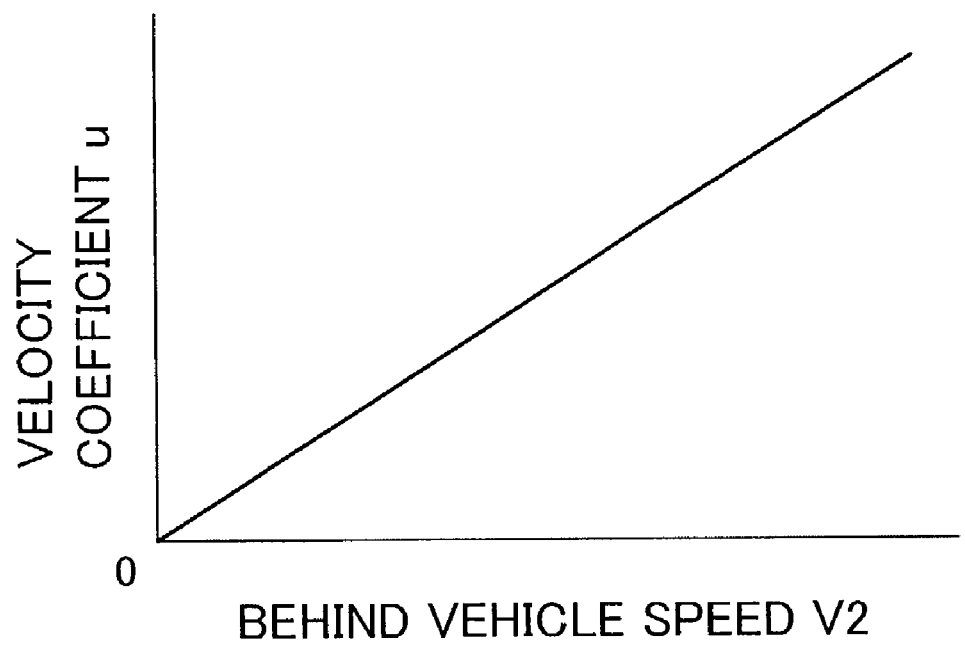
FIG. 11 is a map illustrating a coefficient of velocity relative to the velocity of a vehicle behind.
Figure 12:
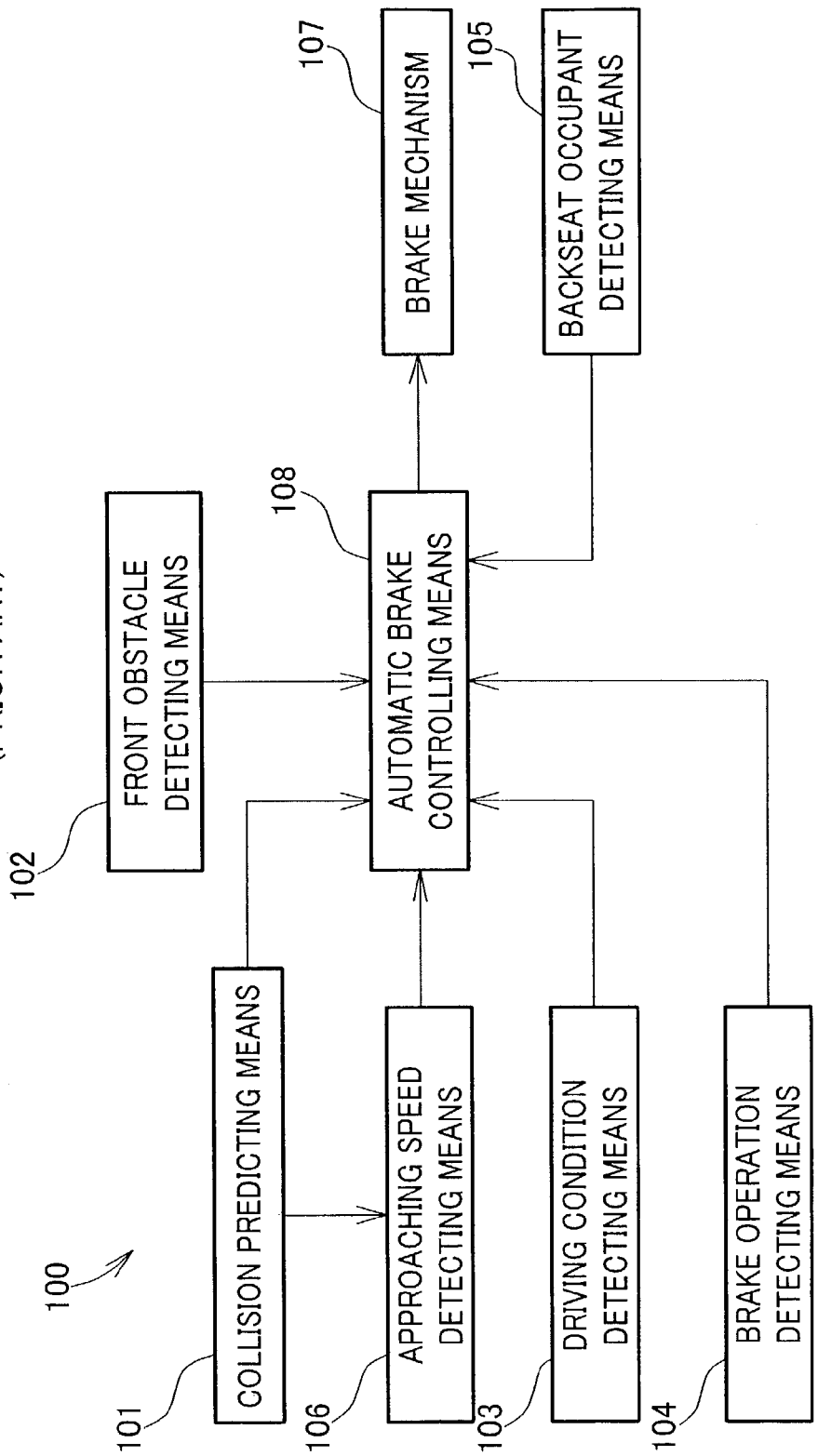
FIG. 12 is a block diagram of the conventional vehicle brake system.

Now, the control operation of the brake controller 26 shown in FIG. 2 will be described with reference to FIGS. 10 and 11 and flowcharts shown in FIGS. 9A to 9D.

STEP (hereinafter abbreviated as ST) 01: the host vehicle speed V1 is determined. The speed V1 is an actual speed V1 determined by the host vehicle speed detector 22 shown in FIG. 2.

ST02: it is determined whether the host vehicle speed V1 is smaller than a predetermined stop threshold V0 or not. When the answer is YES, the procedure proceeds to ST03, and when NO, returns to ST01. The "stop threshold V0" is a reference value to determine whether the host vehicle 10 is stopped or not. When the answer is YES, it is determined that the vehicle 10 is stopped.

ST03: first distances La1, Lb1, Lc1 and Ld1 between the vehicles 10 and 40 are measured. The first distances La1, Lb1, Lc1 and Ld1 are actual distances La1, Lb1, Lc1 and Ld1 between the vehicles 10 and 40 measured by the distance detectors 21A to 21D shown in FIG. 2.

ST04: a timer incorporated in the brake controller 26 (see FIG. 2) is reset and then started.

ST05: this step is repeated until count time t1 of the timer reaches a predetermined very short time t0. Upon reaching, the procedure proceeds to ST06.

ST06: second distances La2, Lb2, Lc2 and Ld2 between the vehicles 10 and 40 are measured. The second distances La2, Lb2, Lc2 and Ld2 are actual distances La2, Lb2, Lc2 and Ld2 between the vehicles 10 and 40 measured as in ST03.

In this manner, through ST03 to ST06, distances between the vehicles 10 and 40 are measured twice to determine the change in distance between the vehicles 10 and 40 during the predetermined time t0.

Description will now be made with reference to FIG. 4. La1 and La2 are distances measured by the first distance detector 21A. Lb1 and Lb2 are distances measured by the second distance detector 21B. Lc1 and Lc2 are distances measured by the third distance detector 21C. Ld1 and Ld2 are distances measured by the fourth distance detector 21D.

ST07 (see FIG. 9B): it is checked whether or not the second distance La2 is smaller than a predetermined closest-approach threshold L0. When the answer is YES, the procedure proceeds to ST08, and when NO, proceeds to ST11. The "closest-approach threshold L0" is a reference value to determine whether or not the vehicle 40 behind is likely to collide with the host vehicle 10.

ST08: it is checked whether or not the second distance Lb2 is smaller than the closest-approach threshold L0. When the answer is YES, the procedure proceeds to ST09, and when NO, proceeds to ST20.

ST09: it is checked whether or not the second distance Lc2 is smaller than the closest-approach threshold L0. When the answer is YES, the procedure proceeds to ST10, and when NO, proceeds to ST14.

ST10: it is checked whether or not the second distance Ld2 is smaller than the closest-approach threshold L0. When the answer is YES, it is determined that there will be a collision from directly behind and the procedure proceeds to ST26, and when NO, proceeds to ST25.

ST11: it is checked whether or not the second distance Ld2 is smaller than the closest-approach threshold L0. When the answer is YES, the procedure proceeds to ST12. When NO, it is determined that there is no possibility of collision with the host vehicle 10, and the procedure returns to ST01 shown in FIG. 9A.

ST12: it is checked whether or not the second distance Lc2 is smaller than the closest-approach threshold L0. When the answer is YES, the procedure proceeds to ST13, and when NO, proceeds to ST32.

ST13: it is checked whether or not the second distance Lb2 is smaller than the closest-approach threshold L0. When the answer is YES, the procedure proceeds to ST27, and when NO, proceeds to ST17.

ST14: it is checked whether or not the second distance La2 is smaller than the second distance Lb2. When the answer is YES, it is determined that there will be an "oblique collision from the left rear" and the procedure proceeds to ST15. When NO, the procedure proceeds to ST21.

ST15: from the distances La2 and Lb2 between the vehicles 10 and 40 and the space (distance between sensors) X1 between the first and second distance detectors 21A and 21B, the collision angle θ of the vehicle 40 behind is derived from the above expression (1) (see FIG. 5).

$$\theta = \tan^{-1}\{(Lb2 - La2)/X1\} \quad (1)$$

ST16: the collision angle θ is compared with a predetermined first reference collision angle α1 and second reference collision angle α2. α1 is smaller than α2. When the collision angle θ is smaller than the first reference collision angle α1 (θ<α1), it is determined that the angle θ of oblique collision from the left rear is small, and the procedure proceeds to ST22. When the collision angle θ is equal to or greater than the first reference collision angle α1 and is equal to or smaller than the second reference collision angle α2 (α1≦θ≦α2), it is determined that the angle θ of oblique collision from the left rear is medium, and the procedure proceeds to ST23. When the collision angle θ is greater than the second reference collision angle α2 (α2<θ), it is determined that the angle θ of oblique collision from the left rear is great, and the procedure proceeds to ST24.

ST17: it is determined whether or not the second distance Lc2 is greater than the second distance Ld2. When the answer is YES, it is determined that there will be an "oblique collision from the right rear," and the procedure proceeds to ST18. When NO, the procedure proceeds to ST31.

ST18: from the distances Lc2 and Ld2 between the vehicles 10 and 40 and the space X1 between the third and fourth distance detectors 21C and 21D, the collision angle θ of the vehicle 40 behind is derived from the expression (2) as described above (see FIG. 6).

$$\theta = \tan^{-1}\{(Lc2 - Ld2)/X1\} \quad (2)$$

ST19: the collision angle θ is compared with the first reference collision angle α1 and the second reference collision angle α2. When the collision angle θ is smaller than the first reference collision angle α1 (θ<α1), it is determined that the angle θ of oblique collision from the right rear is small, and the procedure proceeds to ST28. When the collision angle θ is equal to or greater than the first reference collision angle α1 and is equal to or smaller than the second reference collision angle α2 (α1≦θ≦α2), it is determined that the angle θ of oblique collision from the right rear is medium, and the procedure proceeds to ST29. When the collision angle θ is greater than the second reference collision angle α2 (α2<θ), it is determined that the angle θ of oblique collision from the right rear is great, and the procedure proceeds to ST30.

Figure 9A:
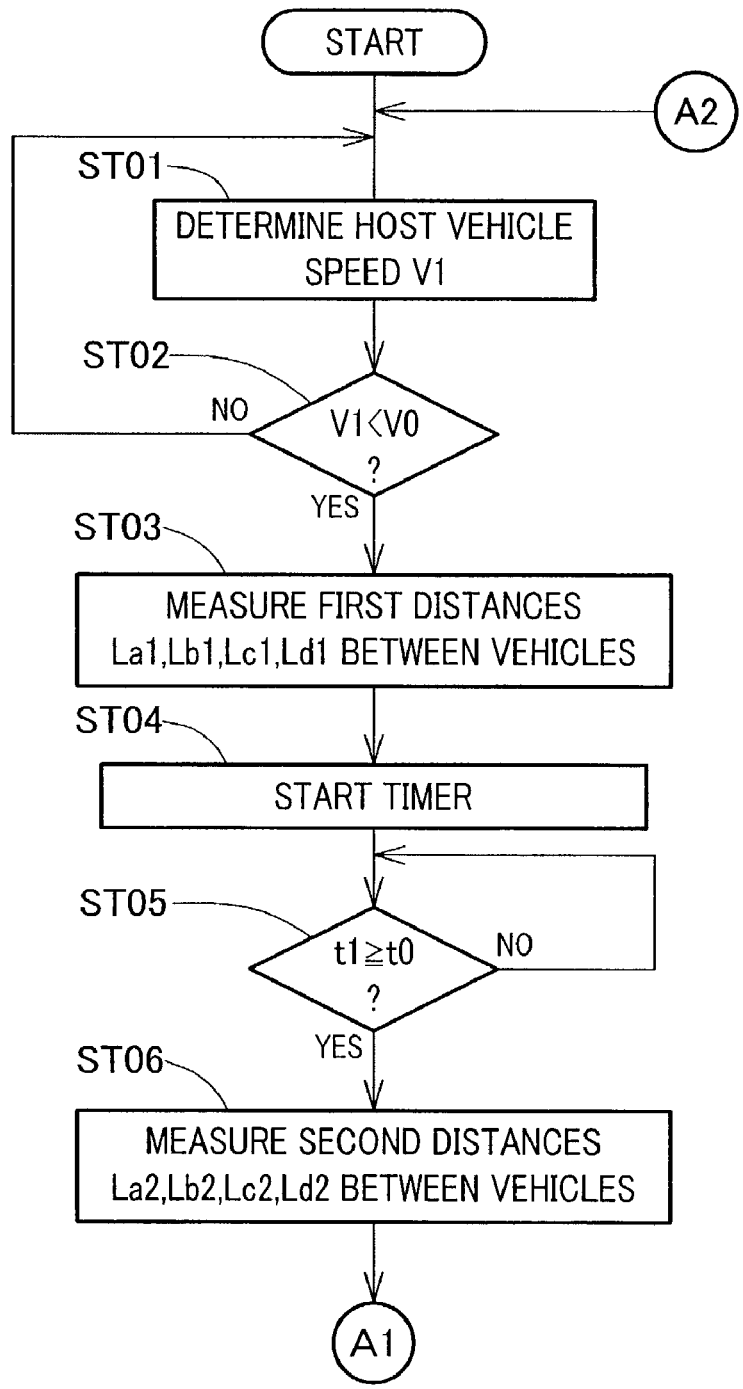
Figure 9B:
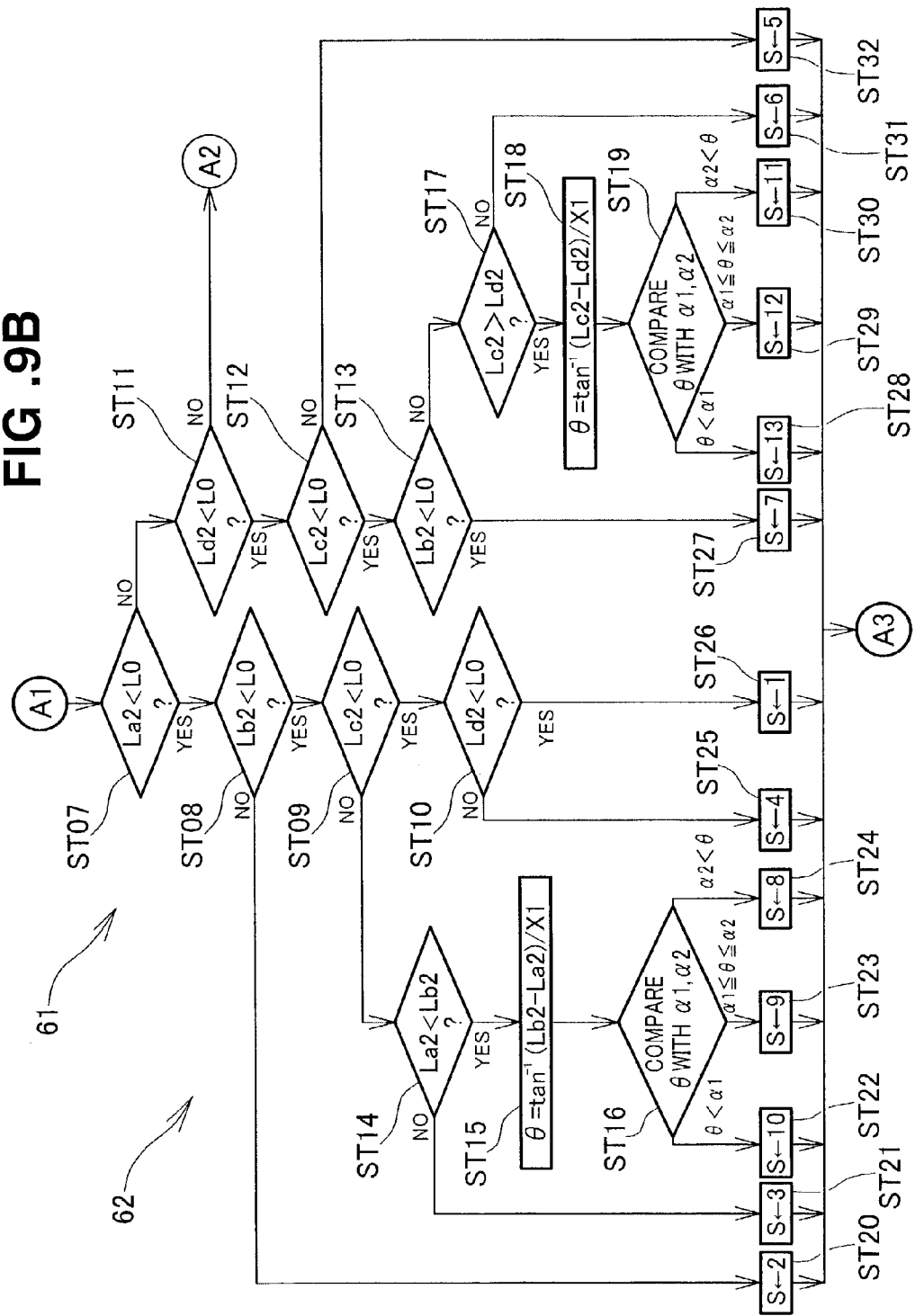
Figure 9C:
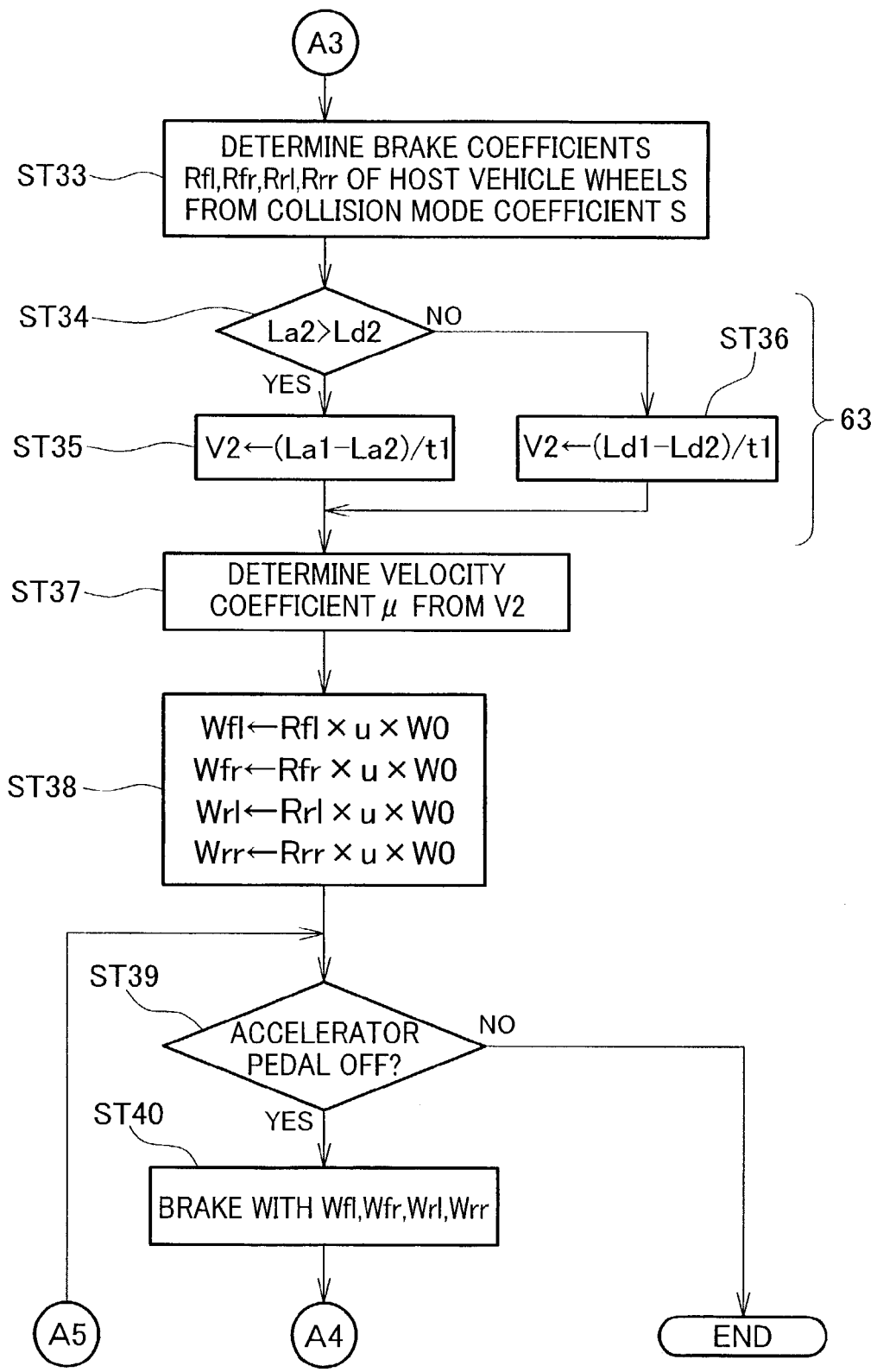

ST20: a collision mode coefficient S is set at 2 and then the procedure proceeds to ST33 shown in FIG. 9C.

ST21: a collision mode coefficient S is set at 3 and then the procedure proceeds to ST33 shown in FIG. 9C.

ST22: a collision mode coefficient S is set at 10 and then the procedure proceeds to ST33 shown in FIG. 9C.

ST23: a collision mode coefficient S is set at 9 and then the procedure proceeds to ST33 shown in FIG. 9C.

ST24: a collision mode coefficient S is set at 8 and then the procedure proceeds to ST33 shown in FIG. 9C.

ST25: a collision mode coefficient S is set at 4 and then the procedure proceeds to ST33 shown in FIG. 9C.

ST26: a collision mode coefficient S is set at 1 and then the procedure proceeds to ST33 shown in FIG. 9C.

ST27: a collision mode coefficient S is set at 7 and then the procedure proceeds to ST33 shown in FIG. 9C.

ST28: a collision mode coefficient S is set at 13 and then the procedure proceeds to ST33 shown in FIG. 9C.

ST29: a collision mode coefficient S is set at 12 and then the procedure proceeds to ST33 shown in FIG. 9C.

ST30: a collision mode coefficient S is set at 11 and then the procedure proceeds to ST33 shown in FIG. 9C.

ST31: a collision mode coefficient S is set at 6 and then the procedure proceeds to ST33 shown in FIG. 9C.

ST32: a collision mode coefficient S is set at 5 and then the procedure proceeds to ST33 shown in FIG. 9C.

ST33 (see FIG. 9C): from the collision mode coefficient S, brake coefficients Rfl, Rfr, Rrl and Rrr of the respective wheels of the host vehicle 10 are determined. Specifically, they are determined based on a map shown in FIG. 10. The map determines the collision mode coefficients S and the associated collision modes and brake coefficients Rfl, Rfr, Rrl and Rrr of the wheels. The brake coefficients Rfl, Rfr, Rrl and Rrr are appropriately set to restrain the turning motion of the host vehicle 10 collided by the vehicle 40 behind in any of the collision modes.

ST34: it is determined whether the second distance La2 is greater than the second distance Ld2. When the answer is YES, it is determined that there is no detection signal from the fourth distance detector 21D (see FIG. 5) (that is, the fourth distance detector 21D detects no colliding vehicle behind), and the procedure proceeds to ST35. When NO, the procedure proceeds to ST36.

ST35: speed V2 of the vehicle 40 behind is determined by calculation. The speed V2 is a value determined by subtracting the second distance La2 from the first distance La1 measured by the first distance detector 21A (see FIG. 5) and dividing the resulting value with the count time t1 (V2=(La1−La2)/t1).

ST36: speed V2 of the vehicle 40 behind is determined. The speed V2 is a value determined by subtracting the second distance Ld2 from the first distance Ld1 measured by the fourth distance detector 21D (see FIG. 6) and dividing the resulting value with the count time t1 (V2=(Ld1−Ld2)/t1).

ST37: from the speed V2 of the vehicle 40 behind, a velocity coefficient $\mu$ is determined. The velocity coefficient $\mu$ is a numeric value with which to correct the braking force of each wheel according to the speed V2. Specifically, it is determined based on a map shown in FIG. 11. From the map with the horizontal axis as the speed V2 of a vehicle behind and the vertical axis as the velocity coefficient $\mu$, the velocity coefficient $\mu$ corresponding to the speed V2 of the vehicle behind is obtained. According to the map, the velocity coefficient $\mu$ is 0 when the speed V2 of the vehicle behind is 0, and increases as the speed V2 of the vehicle behind increases.

ST38: required braking forces Wfl, Wfr, Wrl and Wrr for the respective wheels are determined by calculation. A reference braking force to determine the required braking forces Wfl, Wfr, Wrl and Wrr for the wheels is W0.

The required braking force Wfl for the left front wheel 11FL is a value resulting from multiplying the reference braking force W0 with the brake coefficient Rfl of the left front wheel 11FL and the velocity coefficient $\mu$. The required braking force Wfr for the right front wheel 11FR is a value resulting from multiplying the reference braking force W0 with the brake coefficient Rfr of the right front wheel 11FR and the velocity coefficient $\mu$. The required braking force Wfr for the left rear wheel 11RL is a value resulting from multiplying the reference braking force W0 with the brake coefficient Rrl of the left rear wheel 11RL and the velocity coefficient $\mu$. The required braking force Wrr for the right rear wheel 11RR is a value resulting from multiplying the reference braking force W0 with the brake coefficient Rrr of the right rear wheel 11RR and the velocity coefficient $\mu$.

ST39: it is determined whether the accelerator pedal 12 is off or not. When the answer is YES, it is determined that the pedal 12 is not depressed and the procedure proceeds to ST40. When NO, it is determined that the driver depresses the accelerator pedal 12 to avoid a collision, and the control is terminated. Whether the accelerator pedal 12 is off or not can be determined based on a detection signal of the accelerator pedal detector 23 (see FIG. 2).

ST40: a control signal is transmitted to the brake mechanism 27 (see FIG. 2) to individually brake the wheels with the required forces Wfl, Wfr, Wrl and Wrr, and then the procedure proceeds to ST41 shown in FIG. 9D.

ST41 (see FIG. 9D): a first deformation amount δ1 of the seatback 56 is measured. The first deformation amount δ1 is an actual deformation amount δ1 measured by the seatback deformation amount detector 24 (see FIG. 2).

ST42: a second deformation amount δ2 of the seatback 56 is measured. The second deformation amount δ2 is an actual deformation amount δ2 measured as in ST41.

ST43: it is checked whether the second deformation amount δ2 is smaller than the first deformation amount δ2. When the answer is YES, it is determined that the upper body of the passenger Ma moves forward (rebounds) after the collision and the procedure proceeds to ST44. When NO, the procedure proceeds to ST45.

ST44: the required braking forces Wfl, Wfr, Wrl and Wrr for the respective wheels are corrected with a braking force correction coefficient Δ1. Specifically, the required braking forces Wfl, Wfr, Wrl and Wrr are individually multiplied with the braking force correction coefficient Δ1. The braking force correction coefficient Δ1 is a predetermined value less than 1.0.

ST45: a steering angle St of the steering wheel 13 is measured. The steering angle St is an actual steering angle St measured by the steering angle detector 25 (see FIG. 2).

ST46: the steering angle St is compared with a predetermined leftward steering reference value Sl and rightward steering reference value Sr. When the steering angle St is greater than the leftward steering reference value Sl (St>Sl), it is determined that the wheel 13 is steered to the left, and the procedure proceeds to ST47. When the steering angle St is equal to or greater than the leftward steering reference value Sl and is equal to or smaller than the rightward steering reference value Sr (Sl≦St≦Sr), it is determined that the wheel 13 is not steered, and the procedure returns to ST39 shown in FIG. 9C. When the steering angle St is greater than the rightward steering reference value Sr (Sr<St), it is determined that the wheel 13 is steered to the right and the procedure proceeds to ST48.

ST47: the required braking force Wfl for the left front wheel 11FL and the required braking force Wrl for the left rear wheel 11RL are corrected with the braking force correction coefficient ΔS, and then the procedure returns to ST39 shown in FIG. 9C. Specifically, the required braking forces Wfl and Wrl are individually multiplied with the braking force correction coefficient ΔS. The braking force correction coefficient ΔS is a predetermined value greater than 1.0.

ST48: the required braking force Wfr for the right front wheel 11FR and the required braking force Wrr for the right rear wheel 11RR are corrected with the braking force correction coefficient ΔS. The procedure then returns to ST39 shown in FIG. 9C. Specifically, the required braking forces Wfr and Wrr are individually multiplied with the braking force correction coefficient ΔS.

When the driver steers the steering wheel 13 to the left upon a collision from behind, moving left to avoid obstacles surrounding the host vehicle 10, the required braking force Wfl for the left front wheel 11FL and the required braking force Wrl for the left rear wheel 11RL are increased to enhance the left turning of the host vehicle 10.

Also, when the driver steers the steering wheel 13 to the right upon a collision from behind, moving right to avoid obstacles surrounding the host vehicle 10, the required braking force Wfr for the right front wheel 11FR and the required braking force Wrr for the right rear wheel 11RR are increased to enhance the right turning of the host vehicle 10.

Figure 3:
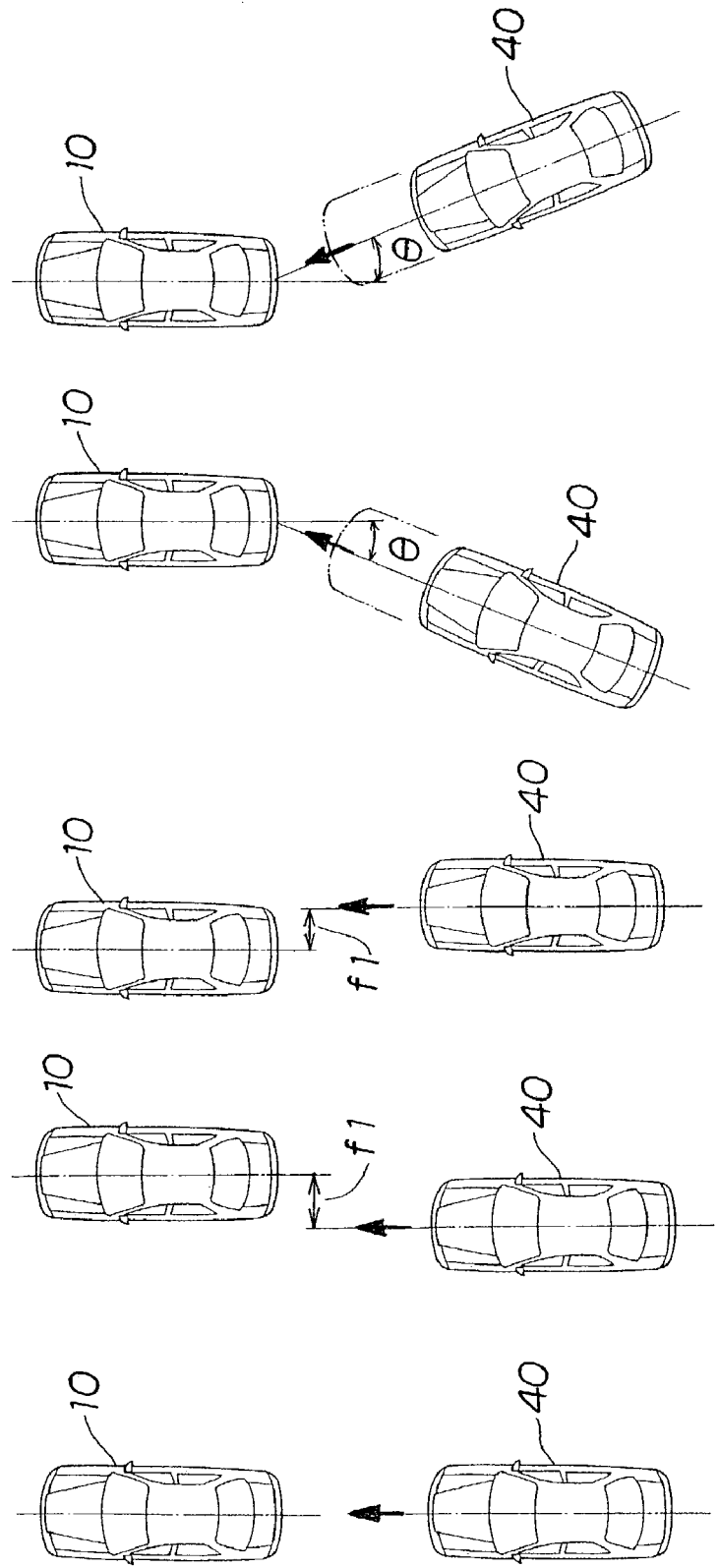
FIGS. 3A, 3B, 3C, 3D and 3E are diagrams illustrating examples of collision types of a vehicle behind with a host vehicle.

The above description will be summarized with reference to FIGS. 1 to 3. The vehicle brake system 20 includes the brake mechanism 27 for braking the wheels 11FL, 11FR, 11RL and 11RR of the vehicle 10, a collision predicting means 61 for predicting the vehicle (colliding object) 40 behind to collide from behind with the vehicle of a speed equal to or lower than a predetermined value, a collision direction detecting means 62 for detecting an off-center amount f1 or a relative collision direction such as a collision angle θ of the vehicle 40 behind with respect to the vehicle 10 ahead, a colliding object speed detecting means 63 for detecting the speed (vehicle speed) V2 of the vehicle 40 behind, and the brake controller 26 for transmitting a control signal to the brake mechanism 27 according to a prediction signal from the collision predicting means 61, a detection signal from the collision direction detecting means 62, and a detection signal from the colliding object speed detecting means 63, to allocate braking forces to the respective wheels 11FL, 11FR, 11RL and 11RR so as to prevent the turning of the vehicle 10 in a collision.

The brake controller 26 includes the collision predicting means 61, collision direction detecting means 62 and colliding object speed detecting means 63. That is, steps ST07 to ST13 in FIG. 9B constitute the collision predicting means 61. Steps ST07 to ST19 in FIG. 9B constitute the collision direction detecting means 62. Steps ST34 to ST36 in FIG. 9C constitute the colliding object speed detecting means 63.

In accordance with a prediction signal transmitted from the collision predicting means 61, a detection signal transmitted from the collision direction detecting means 62 and a detection signal transmitted from the colliding object speed detecting means 63, the brake controller 26 controls the brake mechanism 27 to allocate braking forces to the respective wheels 11FL, 11FR, 11RL and 11RR so as to prevent the turning of the host vehicle 10 in a collision.

In a collision type in which the vehicle 40 behind collides with the host vehicle 10 from directly behind as in FIG. 3A, for example, equal braking forces are allocated to the wheels 11FL, 11FR, 11RL and 11RR shown in FIG. 1.

In a collision type in which the vehicle 40 behind off-centered to the left collides with the host vehicle 10 as in FIG. 3B, a clockwise moment occurs in the host vehicle 10. At that time, braking forces are allocated in such a relation that the braking force on the left rear wheel 11RL is maximum, the braking force on the left front wheel 11FL is large, the braking force on the right front wheel 11FR is medium and the braking force on the right rear wheel 11RR is small, thereby generating a counterclockwise moment. As a result, the clockwise moment caused by the collision from behind is cancelled for balance control in the controlling direction, restraining the turning motion of the host vehicle 10.

In a collision type example in which the vehicle 40 behind obliquely collides with the host vehicle 10 from the left rear as in FIG. 3D, a counterclockwise moment occurs in the host vehicle 10. At that time, braking forces are allocated in such a relation that the braking force on the right rear wheel 11RR is maximum, the braking force on the right front wheel 11FR is large, the braking force on the left front wheel 11FL is medium, and the braking force on the left rear wheel 11RL is small, thereby generating a clockwise moment. As a result, the counterclockwise moment caused by the collision is cancelled for balance control in the controlling direction, restraining the turning motion of the host vehicle 10.

Even when the vehicle 40 behind collides with the host vehicle 10 from behind obliquely or from a rear off-center position, braking forces can be allocated in accordance with the collision type and the speed V2 of the vehicle 40 behind to restrain the turning motion of the host vehicle 10.

As a result, acceleration in the turning direction exerted on passengers in the host vehicle 10 can be restrained. Thus the passenger protection can be further improved. For example, the body of the passenger Ma seated in the seat 50 is prevented from swinging sideways as shown in FIGS. 8A and 8B, the neck Ne of the passenger Ma can be securely supported on the headrest 57 of the seat 50. That is, the headrest 57 can be effectively utilized. The strain on the neck Ne of the passenger Ma can thus be more reliably reduced.

Further, since the turning motion of the host vehicle 10 is restrained, the behavior of the host vehicle 10 after a collision can be stabilized. The host vehicle 10 can thus easily avoid surrounding obstacles if any.

In the above-described embodiment of the present invention, the number of the distance detectors 21A to 21D are not limited to four. For example, the distance between vehicles, the relative collision direction and the speed of a vehicle behind can be measured with two distance detectors by setting the angle of beam spread of the distance detectors such as radar sensors larger.

The brake controller 26 is not limited to the configuration to direct the brake mechanism 27 in accordance with a detection signal from the seatback deformation amount detector 24 to reduce braking force. For example, in place of the seatback deformation amount detector 24, an acceleration sensor may be mounted to the vehicle 10. An acceleration sensor can also detect that after the upper body of the passenger Ma moves backward in the reaction to a collision, the upper body of the passenger Ma again moves forward in the reaction of pressing the seatback 56 at the upper body of the passenger Ma. It is thus possible to configure the brake controller 26 to direct the brake mechanism 27 in accordance with change in acceleration measured by the acceleration sensor to reduce braking force.

Furthermore, the brake mechanism 27 may be electrically driven instead of hydraulically driven. Electrical driving further facilitates braking control.

The collision predicting means 61, collision direction detecting means 62 and colliding object speed detecting means 63 are not limited to the configurations of being incorporated into the brake controller 26, and may be separately and independently configured.

The present disclosure relates to the subject matter of Japanese Patent Application No. 2002-166114, filed Jun. 6, 2002, the disclosure of which is expressly incorporated herein by reference in its entirety.

What is claimed is:

1. A vehicle brake system, comprising:
   a brake mechanism for individually braking wheels of a vehicle;
   a vehicle speed sensor for detecting a speed of the vehicle;
   a plurality of distance sensors disposed at a rear end of the vehicle at regular intervals in a transverse direction of the vehicle for detecting linear distances between the respective distance sensors and an approaching object behind the vehicle; and
   a brake controller for directing said brake mechanism to automatically operate, said brake controller comprising:
      a collision predicting means for predicting the occurrence of a collision of the approaching object with the vehicle when the speed of the vehicle detected by the vehicle speed sensor is equal to or lower than a predetermined threshold and when the linear distance detected by at least one of said distance sensors is smaller than a predetermined reference value;
      a collision orientation determination means for determining a relative collision orientation between the vehicle and the approaching object on the basis of the linear distances detected by said distance sensors; and
      an approaching object speed determination means for determining a speed of the approaching object on the basis of a rate of change per unit time of the linear distance detected by said at least one distance sensor,
      said brake controller directing said brake mechanism in accordance with the predicted occurrence of collision by said collision predicting means, the relative collision orientation determined by said collision orientation determination means and the speed of the approaching object determined by said approaching object speed determination means, to allocate braking forces to the respective wheels so as to prevent the turning of the vehicle in the collision.

2. A vehicle brake system as set forth in claim 1, wherein the vehicle is a parked vehicle.

3. A vehicle brake system as set forth in claim 1, wherein said brake mechanism includes a left front brake for braking a left front wheel, a right front brake for braking a right front wheel, a left rear brake for braking a left rear wheel and a right rear brake for braking a right rear wheel, and a main brake for allocating braking forces to said left front brake right front brake, left rear brake and right rear brake.

4. A vehicle brake system as set forth in claim 1, wherein said collision orientation determination means is configured to determine an off-center amount or a collision angle of the approaching object with respect to a longitudinal axis of the vehicle on the basis of the linear distances detected by the distance sensors.

5. A vehicle brake system as set forth in claim 1, further comprising a steering angle sensor associated with a steering wheel of the vehicle for detecting a steering angle of the steering wheel, wherein said brake controller is operatively connected to the steering angle sensor in such a manner that when a steering angle greater than a predetermined reference value in either direction has been detected by said steering angle sensor, the brake controller directs the braking mechanism to increase the braking forces allocated to wheels on the same side as the steering direction.

6. A vehicle brake system as set forth in claim 4, wherein said brake controller further comprises a first map configured to establish a corresponding relationship between each of plural different collision modes that are determined on the basis of the off-center amount or the collision angle and a respective one of sets of brake coefficients that are used to determine braking forces to be applied to the respective wheels of the vehicle.

7. A vehicle brake system according to claim 6, wherein said brake controller further comprises a second map configured to establish a corresponding relationship between the speed of the approaching object and a velocity coefficient that is used in combination with each set of brake coefficients to determine the braking forces to be applied to the respective wheels of the vehicle, the velocity coefficient is 0 when the speed of the approaching object is 0 and increases as the speed of the approaching object increases.

8. A vehicle brake system according to claim 1, further comprising a seatback deformation sensor associated with each passenger seat of the vehicle for detecting an amount of deformation of a seatback of the passenger seat, wherein said brake controller is operatively connected to the seatback deformation sensor in such a manner that when the seatback deformation sensor detects reduction of the amount of deformation to a predetermined value after the collision occurs, the brake controller directs the braking mechanism to reduce the braking forces allocated to the respective wheels of the vehicle.

* * * * *